United States Patent [19]

Clark et al.

[11] 4,011,782
[45] Mar. 15, 1977

[54] POWER MITER SAW

[75] Inventors: Donald Lawrence Clark; Floyd Samuel Fraunfelter, Jr., both of Lancaster, Pa.; Robert Richard Ruth, Baltimore, Md.

[73] Assignee: The Black and Decker Manufacturing Company, Towson, Md.

[22] Filed: Sept. 25, 1975

[21] Appl. No.: 616,610

[52] U.S. Cl. .................................. 83/471.3; 83/473; 83/477.1; 83/490; 83/564; 83/581

[51] Int. Cl.² ................................................ B27B 5/20

[58] Field of Search .............. 83/471.3, 473, 477.1, 83/490, 564, 581

[56] References Cited

UNITED STATES PATENTS

| | | | |
|---|---|---|---|
| 1,481,569 | 1/1924 | Tannewitz | 83/471.3 |
| 2,496,716 | 2/1950 | Hanna | 83/490 |
| 2,714,903 | 8/1955 | Miller | 83/564 |
| 3,026,917 | 3/1962 | Schwartz | 83/477.1 X |
| 3,105,528 | 10/1968 | Loughridge | 83/490 X |
| 3,275,044 | 9/1966 | Kisling | 83/473 |
| 3,483,901 | 12/1969 | Ray | 83/471.3 |
| 3,821,918 | 7/1974 | Niehaus | 83/471.3 |

*Primary Examiner*—Willie G. Abercrombie
*Attorney, Agent, or Firm*—Joseph R. Slotnik; Walter Ottesen; Edward D. Murphy

[57] ABSTRACT

A power miter saw of the type comprising a bridge-shaped base member and a main swinging lever pivotally mounted therebelow for motion about a vertical axis, the improvements which comprise a one hand operated detent and locking means at the front end of the swinging lever; and an improved saw mounting means at the rear end of the lever which defines the upper and lower limits of motion of the saw, which permits locking the saw down close to the base, and which normally bias the saw to a "ready" position.

24 Claims, 8 Drawing Figures

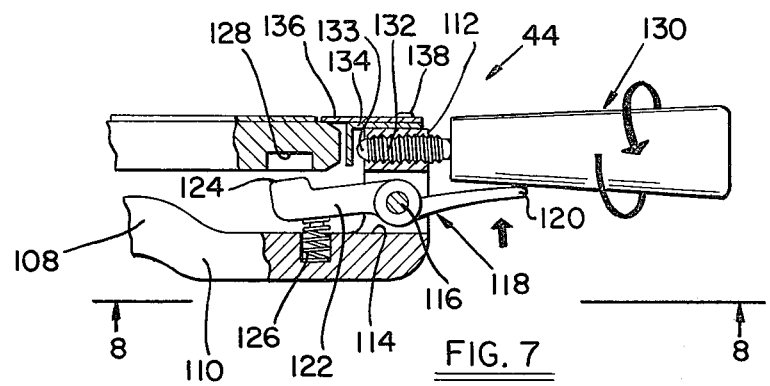
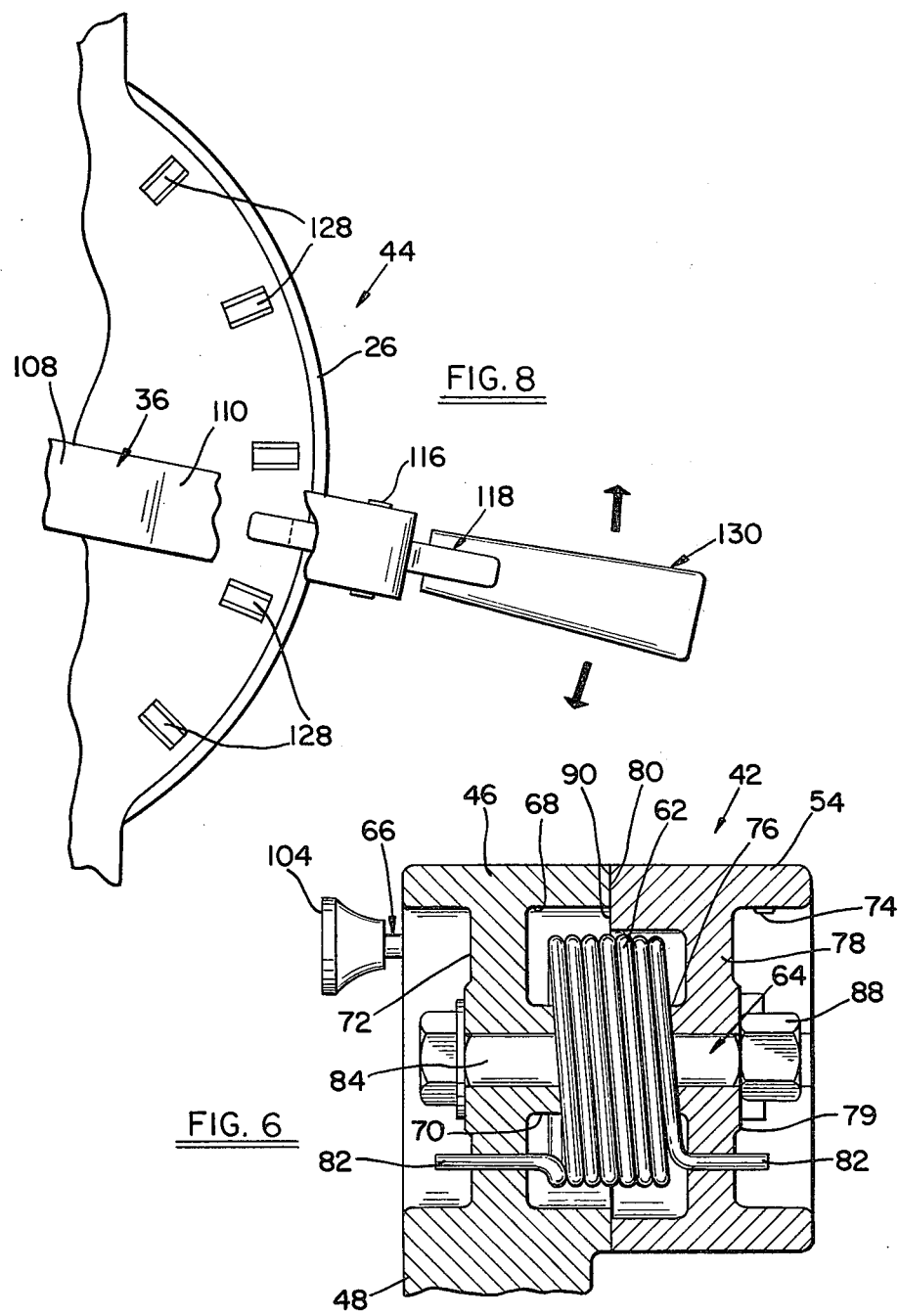

POWER MITER SAW

This invention relates to power tools, and more specifically it relates to a power miter saw.

Miter cutting is required in many industries on various materials such as wood, metals, and plastics. A great deal of miter cutting is done, in construction, particularly in residential building, wherein moldings, doors and window frames, and the like parts must be miter cut at corners. A single residence requires a relatively large number of such cuts. The prior art in the field includes the hand miter box in which a wooden frame with means to hold a saw at various different angles is used by the workmen to make the miter cuts. With the increasing cost of labor in all fields, the need for a good power miter saw is great. In order to facilitate its use around the construction site, the tool must be light enough to be readily portable and yet heavy enough to not move while being used, and sturdy enough to withstand rough commercial usage.

One prior solution has been to bring a radial arm or power table saw to the work site. This solution has the disadvantage that such saws are not portable, and the workmen must bring the material to the saw. Further, because of relatively high cost, one saw must be made to serve many workmen, and accordingly time is often wasted as the workmen wait their turn to use the tool. This problem is solved by the tool of the invention in that it may be carried from room to room and is inexpensive enough that more than one can be provided at a single work site. Additionally, the power miter saw of the invention provides the same cut-off, trimming, as well as the mitering functions, customarily heretofore performed by the stationary and much more expensive radial arm or table saw.

The invention comprises a bridge-like base, and a swinging lever pivotally mounted below and centrally of the base for motion about a vertical axis. At its forward end, the lever carries an improved one-hand operated indexing and locking means for the lever and for the saw carried at its rear end. The saw itself, which is similar to a conventional portable circular saw, is on a saw arm pivotally mounted by improved means at the rear end of the lever.

The improved mounting means includes means to normally bias the saw to the upright position, to lock the saw in the down position, and to define the upper and lower limits of motion of the saw on the pivot means at the rear end of the lever. This portion of the invention comprises a pair of short cylindrical sections, or base portions, one on the end of the lever, and one at the end of the saw arm, and an internal torsion spring. A pin cooperating with a slot and a hole in the cylindrical sections defines said upper and lower limits, and provides the means to lock the saw in its down position.

A second area of improvement of the invention over the prior art is the one hand operated detent and locking means to swing the saw to define the various miter cuts that might be required, and to simply and easily lock the saw in these various preselected and all intermediate positions. The invention provides means to permit this movement and the locking and detenting all with one-hand operation. A handle, which is twisted to unlock the lever and which bears against rigid means on the base to lock it, is provided at the front end of the lever, and this handle may be manipulated with only one hand. Further, in closely spaced relation to this handle, on the lever, there is provided a trigger operated detent lug spring loaded up against the underside of the base. By locating this detent in various predetermined recesses in the underside of the support, these predetermined angles can be quickly locked into position by the operator. That is, the operator depresses the trigger, swings the lever to a predetermined approximate position, then releases the trigger, whereupon the saw will detent home either by itself, or with just a slight "jiggle" by the operator to find a detent depression. Thus, the detenting as well as the locking is readily at hand on the front end of the swinging lever to facilitate one-hand operation.

Some prior art structures include detenting and locking means at the front of the base. However, most such devices are not susceptible to one hand operation, and require an inherently clumsy manipulation by the operator. The operator must use both his hands to simultaneously hold the saw in the desired position with one hand, while with the other hand adjusting some sort of locking means, usually in the nature of a thumb screw or the like. This is often frustrating and time consuming, in that the space in which these two means are provided is often very small, the operator in effect gets in his own way by having to put both his hands in this relatively confined space. These rather serious disadvantages are overcome by the one hand operated detent and locking means of the invention; the operator, with a simple, smooth, quick one hand operation, first loosens the apparatus from a previous position, opens the detenting means, swings the saw to another position, detents in that position, and then tightens up the locking means again, all of the above functions are being performed more quickly than can the above description of them be read by the average person.

The invention resides primarily in these two portions of the power miter saw, and these portions produce important advantages for the invention power saw over prior and competing power saws. Such prior devices utilize complicated cantilevered springs, counterweights, and the like in place of and in lieu of the torsion spring and locking arrangement of the invention. Such complicated devices are expensive, susceptible to damage, susceptible to fatigue, and the like. Counterweight type systems have the disadvantage of adding weight to the total tool, and adding the weight at a location where it tends to unbalance the tool in use. This is particularly important in that the tools are most frequently spring or weight biased to the upper position so that an operator can simply release the tool when he is finished using it. The combination of the counterweight, and the amount of force produced when the tool rapidly moves upwardly and hits against a stop could upset the entire tool. To counteract this, it may be necessary to secure the tool to a table, which of course defeats one of the primary advantages, i.e., the tool is no longer portable. The present invention overcomes this particular disadvantage by providing a torsion spring in combination with a relatively stable and heavy base to permit this spring loading to the upper position, while at the same time preventing upsetting of the tool if the operator should simply release the saw and allow the spring to push it upward.

Further, the structure and assemblage of parts is such that the invention could be used with other forms of springs, or possibly even with a counterweight in lieu of a spring, if such should be desired, while at the same time retaining the basic advantages inherent in the mounting means between the swinging lever and the saw arm.

The above and other advantages of the invention will be pointed out or will become evident in the following detailed description and claims, and in the accompanying drawings also forming a part of the disclosure in which:

FIG. 4 is an exploded view of the mounting means, the swinging lever and the saw arm;

FIGS. 5 and 6 are cross-sectional views thereof;

FIG. 7 is a side elevational view, with some parts broken away and in cross-section of the one hand operated locking and detenting means; and FIG. 8 is a top elevational view of the structure of FIG. 7.

Figure 1:
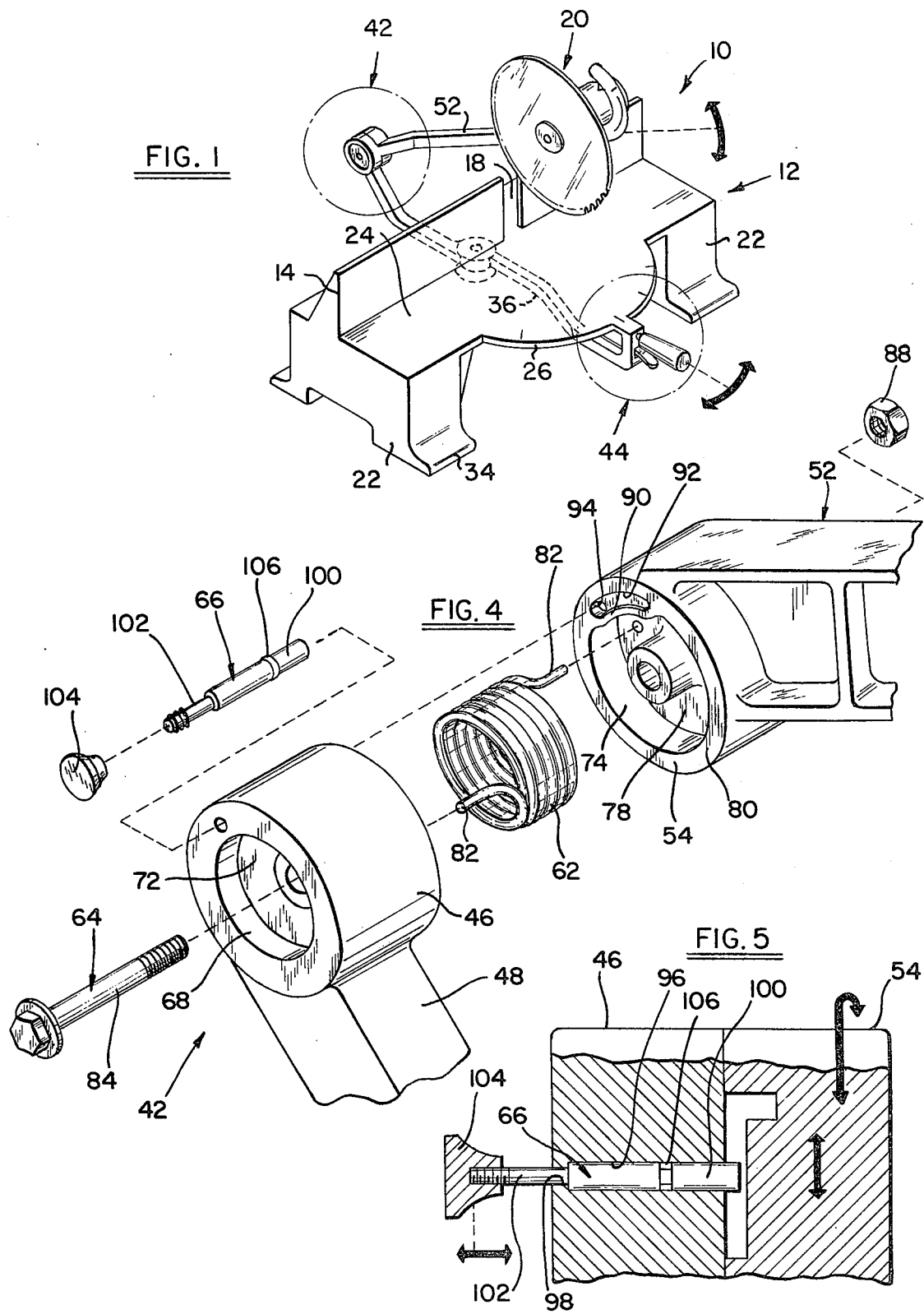
FIG. 1 is a perspective view, partly diagrammatic, showing a power miter box embodying the invention.

Referring now in detail to the drawing, in FIG. 1 there is shown a power miter tool 10 embodying the invention. The tool is built upon a base 12 which carries a work fence 14 and a work support member 16. Member 16 is preferably made of wood, pressed board, or the like relatively soft material, in the usual manner. The fence 14 is provided with a slot 18 to permit the blade of the saw means 20 to pass therethrough. The tool 10 will also include suitable guards around the saw blade, which guards rest and are moved by contact against the work; the guards having been omitted from the drawings for the sake of clarity.

Base 12 is of a generally bridge-like configuration, and comprises a pair of spaced apart generally parallel disposed leg portions 22 which support a top plate portion 24 extending thereacross. The leg portions 22 are provided with perforated feet 34 for purposes of permitting the securing of the tool 10 to a work surface either permanently or temporarily, if and when desired. Portion 24 comprises a forwardly extending half moon shaped arcuate front flange portion 26 which carries an arcuate indicator scale 28 at its top front edge. Below portion 24, the base 12 comprises various structural supportive ribs and struts, all generally indicated by reference numeral 30, see FIGS. 2 and 3. Centrally of the supportive and reinforcing structure 30, the base member comprises a boss 32 having a vertically disposed axis and positioned centrally below the top portion 24 and the slot 18 in the fence 14. Pivotally mounted on boss portion 32 is a main swinging lever 36, shown schematically in FIG. 1 and in elevation in FIG. 3, which carries all the remaining parts of tool 10. Lever 36 comprises a central boss portion 38 which fits upon and mates with the boss 32 of the base 12. Pivot means 40, which may comprise simply a suitable nut, bolt and washer, pass through the mating boss portions 32 and 38, whereby the lever 36 may swing about the vertical axis defined by the pivot means 40. The bosses 32 and 38 meet at their facing annular surfaces which carry the entire weight of the saw and defines the plane of rotation. It has been found that no additional bearing means is required, the surfaces having a reasonably smooth finish, and a suitable lubricant, such as a grease, being provided at this interface to permit smooth rotary sliding action therebetween.

Figure 2:
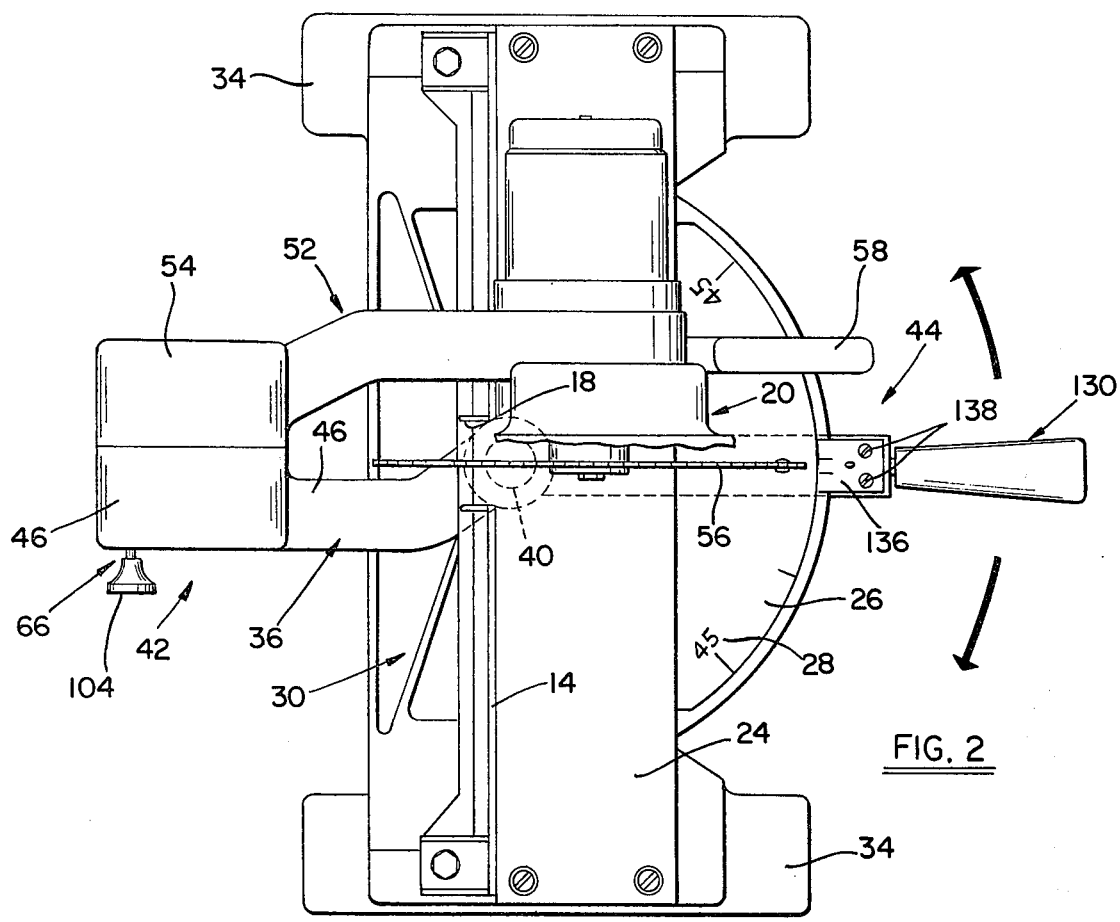
FIG. 2 is a top plan view, with some parts broken away and in cross-section of a preferred embodiment of a tool embodying the invention.
Figure 3:
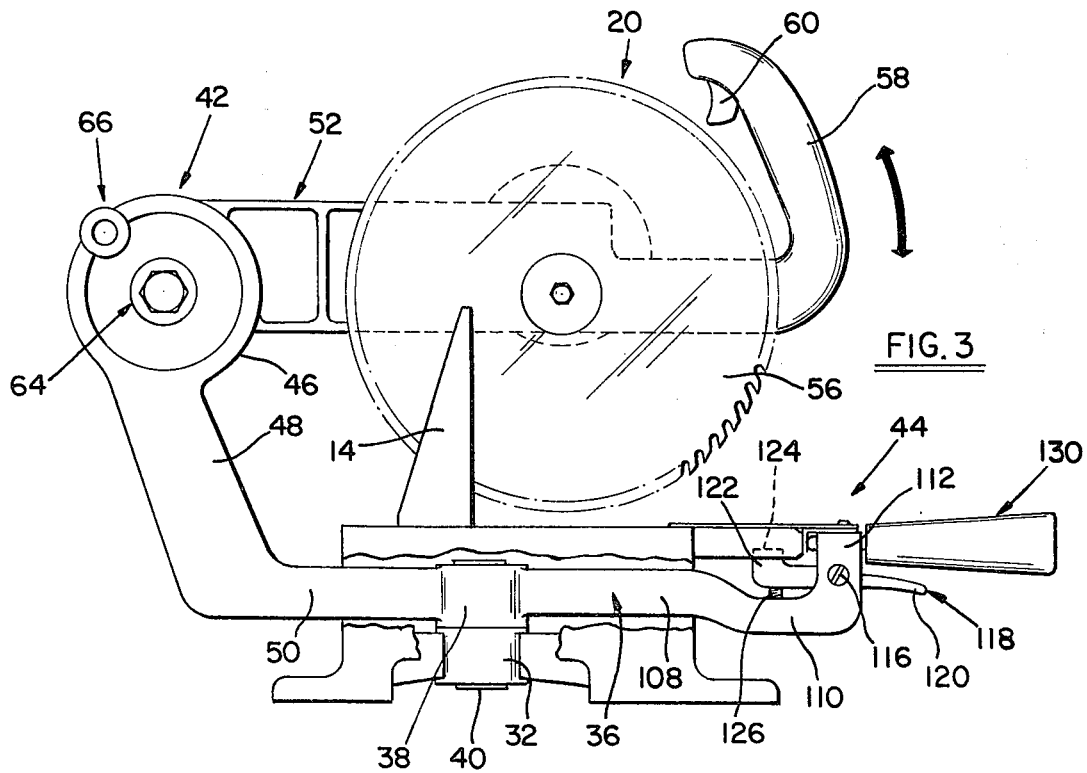
FIG. 3 is a side elevational view thereof with some parts broken away.

Rearwardly of the boss portion 38, the invention comprises mounting means 42, which includes means to control the up and down limits of motion of saw means 20 on lever 36 and to lock the saw down as required; and a one hand operated locking and detenting means 44 is carried at the forward end of lever 36. Portion 42 is shown in detail in FIGS. 4, 5, and 6; lock and detent portion 44 is shown in detail in FIGS. 7 and 8; and both portions are shown in FIGS. 2 and 3.

Referring now to portion 42, a boss 46 is formed on the rearwardly extending end of a portion 48 of the lever 36 which extends rearwardly and upwardly from a generally horizontally disposed portion 50 of the lever 36, which in turn extends backwardly from the boss 38 to a location rearwardly beyond the base 12. A saw arm 52 has a rear end boss portion 54 which cooperates with boss 46 to define the mounting means 42 at the rear end of the swinging lever 36. The saw 20 is mounted at the front end of the saw arm 52, and comprises a saw blade 56, and an upward open handle 58 which carries a trigger switch 60 for operating the saw. Saw means 20 per se has no further bearing on the invention and therefore need not be described any further herein.

Referring now particularly to FIGS. 4, 5 and 6, the structure and operation of the portion 42 can be seen in detail. The basic parts of portion 42 comprise the two bosses 46 and 54, a torsion spring 62, a pivot pin 64, and a rotation stop and lock pin 66. Referring to FIG. 6, the structure of boss 46 consists of an outer cylindrical section 68, an inner cylindrical section 70 having an axial length substantially less than that of section 68, and an annular web 72 interconnecting sections 68 and 70. The boss portion 54 is similar, and it comprises outer and inner cylindrical sections 74 and 76 and an interconnecting web 78. Web 78 on its outside surface carries a shoulder 79 which defines a hex recess to hold the nut 88 of the pivot means to facilitate assembly of the parts. The bosses 46 and 54 meet at a common plane 80, which plane is at a right angle to the axis of rotation of the saw arm 52 on the rear end of swinging lever 36. Spring 62 is coiled about the inner faces of the two inner cylindrical sections 70 and 76 of the two bosses 46 and 54, and the ends 82 of said spring 62 are anchored therein by being fitted into suitably formed openings in the webs 72 and 78 of said bosses. In this matter, the spring 62 loads the saw arm with respect to the swinging lever to bias saw means 20 to a normal up or "ready" position.

The pivot assembly 64 comprises a pivot pin 84, which may be simply a threaded bolt of a suitable diameter and length, a lock or spring washer, such as a dish type, a Belleville spring, or the like, and a lock nut 88 of any suitable type to hold the assembly together in position as shown in FIG. 6. The spring washer 86, in cooperation with the lock nut 88, provides the advantage that the bosses 46 and 54 may be brought together under any predetermined tightness, and will thereafter hold that predetermined tension. This condition naturally helps in the operation of the rotation control means 42. It will, of course, be appreciated that the surfaces at the plane 80 do not carry the weight of the tool, this loading function being performed by the pin or bolt 84 in the pivot means assembly 64.

Means are provided in portion 42 to define the upper and lower limits of motion of the saw arm 52 on the swinging lever. These means include the stop pin 66 and also comprise an enlarged portion 90 formed in the outer cylindrical portion 74 of the saw arm boss 54. Enlarged portion 90 is formed with a composite opening comprising arcuate groove 92 of relatively shallow depth, and a deeper hole 94 at one end thereof. These two portions are best shown in FIG. 5 this view being taken on a curved cutting line through the arcuate composite cutout 92 and 94. The outer cylindrical section 68 of boss 46 is formed with a composite through opening comprising an inside larger diameter portion 96 and an outside smaller diameter axially aligned portion 98. The pin 66 comprises an enlarged portion 100 and a smaller outwardly extending shank portion 102 which is threaded and carries knob 104 at its outside end. An o-ring 106 is fitted in a suitably formed groove in the body portion 100. This o-ring bears against the inside of the larger hole portion 96, not for the ordinary purpose of providing a fluid seal, but for the purpose of providing a predetermined small amount of friction or resistance to unintentional movement of the pin 66, whereby the pin 66 will tend to remain in any position at which it is manually set. Once assembled as shown in FIG. 5, the pin 66 is trapped in the boss 46. The length of the portion 96, with respect to the length of the main body of the pin 100, is such that the inside end of the pin will always be positioned at least in the arcuate slot 92. When desired, when the saw is in the down position, knob 104 can be pushed inwardly, and the end of the pin, to the right of the o-ring 106 in FIG. 5, will enter the hole 94, whereby the saw will be locked into the down position. When so locked down, the saw is very easily portable by grasping the handle 58 or grasping the saw arm 52, and further the saw is quite safe even if plugged in in this condition, since it is not readily possible to get a hand under the saw blade so long as the guards, not shown, are in place and functional. The positioning of the inside end of the body 100 of the pin 66 in at least the slot 92 provides the advantage of limiting the motion of the saw upwardly and downwardly within predetermined bounds defined by the length of the arcuate slot 92. In this manner, the trapped pin 66 in cooperation with the slot 92 defines the up and down stop limits. These limits are, of course, predetermined and are actually defined by the length of the arcuate slot 92 with respect to the diameter of the main body 100 of the pin 66.

The one-hand operated locking and detenting portion 44 is built on a portion 108 of the swinging lever 36 which extends forwardly from boss portion 38. Portion 108 has a stepped down portion 110, and the forward end of the swinging lever 36 finally terminates at an upstanding finger portion 112.

The one-hand operated locking and detenting portion of the invention is built onto these two portions 110 and 112 of the swinging lever 36. Portion 112 is formed with a through opening 114, preferably of rectilinear cross section, across which is mounted a pivot pin 116 on which is pivotally mounted a finger operated trigger latch member 118. Pin 116 is held in place by any suitable means such as set screws not shown. Trigger 118 comprises a front end manually operable portion extending forwardly of the pivot 116, and a rear end detent portion 122 having a detent lug 124 at its innermost end. A compression spring 126 is seated in a suitable formed opening in the top surface of stepped down portion 110, and has its upper end bearing against the underside of the detent portion 122. Thus, trigger member 118 is normally biased in a clockwise direction around the pivot 116 with the detent lug 124 bearing against the underside of the base front flange portion 26. Referring to FIG. 8, the underside of said flange 26 is formed with a plurality of detent recesses 128 arranged at predetermined angular positions around the outside of the arcuate shaped flange 26. These recesses, in cooperation with the detent lug 124, position the saw 20 at predetermined angular positions, to thereby make miter cuts at the corresponding angles. The five lugs shown in FIG. 8 correspond to angles of 0°, and 22½° and 45° to both the right and left sides of the 0° straight position. Of course, more or fewer detent recesses 128 could be provided, and other predetermined angular positions could also be provided by locating other recesses 128 at corresponding positions. The saw 20 is automatically positioned when the detent lug 124 homes into one of the recesses 128, and will cut at the predetermined angle corresponding to that particular recess 128. The arrow shown in FIG. 7 is indicative of the force of the user's finger compressing the spring 126, and showing the parts ready to be moved out of a detented position and into some other position.

Means are provided to additionally securely lock the saw in position, and also to lock the saw at angles other than and between those determined by the recesses 128. To this end, a handle member 130 having a threaded stud 132 fitted into a suitably mating threaded opening in the finger portion 112 above the opening 114 for the trigger 118. The top of the finger portion 112 carries an L-shaped bearing plate 134 and an indicator plate 136, arranged with the indicator plate on top of the bearing plate and held in position down against the top of the finger portion 112 by means of a pair of screws 138. The vertical flange of the plate 134 is disposed between the nose end 133 of the stud 132 and the arcuate curved outer surface of the flange portion 26. This arrangement protects against damage which might be caused by repeated tightening and loosening of the nose portion 133 up against the edge of flange 26. The indicator plate 136 carries a reference mark, and could also carry a vernier scale, and these markings cooperate with those on the scale 28 fixed close to the outer arcuate edge of the flange 26 to thereby easily and conveniently locate the saw at any angle within the capacity of the tool. In the successfully constructed embodiment, the tool has an angular capacity of 47° both left and right of the zero center point. An advantage of this structure is that by simply loosening the screws 138, the bearing plate 134, which is a small inexpensive part, can be replaced thereby protecting the flange and hence the base and, in turn, the entire tool itself, against damage and premature failure due to wear.

OPERATION

The use of portion 44 is extremely simple and natural to the feel of the operator's hand. The knack of using it easily and quickly, after only two or three repetitions, becomes natural and readily accomplished. The operator simply, in one smooth motion, twists the handle 130 approximately ¼ or ½ turn to loosen it, while at the same time with the index finger of that hand pressing the trigger portion 120 of member 118 to unlock the detent 124–128. Then, while holding the trigger portion 120 upwardly, with the spring 126 compressed, the user can by means of the handle 130 swing the entire arm 36 and hence the saw means 20 thereon to some other desired position, either a detented position or some other angular position, and then may release the detent trigger 118 and retighten the saw by twisting the handle 130 the ¼ or ½ turn back to the tight position at the new angular position.

The use and operation of portion 42 is equally simple, foolproof, and advantageous. Once some desired angular position is set, the user simply grasps the handle 58 and pulls the saw down against the work, thereby storing energy in the spring 62 in the portion 42. The work support 16 is protected against damage by the interaction of the pin 66 in the arcuate slot; that is, the saw may go no further down towards the table than the position determined by parts 100 and 92. When the user is finished, he may either simply release the saw, allowing the predetermined strength of the spring 62 to return it to the ready or up position, or, commonly, the user will be in the habit of raising his arm to gently place the saw back to this ready or up position to thereby prevent abuse of the parts. That is, the user will be in the habit of controlling the spring return of the saw means. Another facet of this portion 42 is its use in carrying or storing the tool. In such case, the user grasps the handle 58, lowers the saw to the downmost position, at which time the pin means 66 in the boss member 46 lines up with the deeper hole 94 in the mating boss 54. Then, the operator can simply push in knob 104, driving the body of the pin 100 into the hole 94, thereby firmly locking the saw in the down position facilitating its safe handling.

While the invention has been described in detail above, it is to be understood that this detailed description is by way of example only, and the protection granted is to be limited only within the spirit of the invention and the scope of the following claims.

We claim:

1. In a power miter saw of the type comprising a bridge-shaped base and a swinging lever pivotally mounted therebelow for motion about a vertical axis, the improvement comprising mounting means at the rear end of said swinging lever for mounting saw means thereon, said mounting means comprising means to normally bias said saw means to an up position with respect to said base, said mounting means comprising means to define the upper and lower limits of motion of said saw means with respect to said base, and said mounting means comprising means to manually lock said saw means in a down position in closely spaced relation to said base, said mounting means comprising a saw arm carrying said saw means on the forward end thereof, said mounting means comprising a pair of boss portions formed one on said saw arm and the other on the rear end of said swinging lever, a pin member carried by one of said boss portions, an arcuate slot and a hole deeper than the depth of said arcuate slot formed in the other of said boss portions, said pin member being so configured with respect to said one of said boss portions that the free end of said pin is positioned in said arcuate slot formed in said one of said boss portions in the assembled together condition of said boss portions, and said hole being located at the end of said slot corresponding to said down position.

2. The combination of claim 1, wherein said saw arm boss portion is formed with said arcuate slot and said swinging lever boss portion carries said pin member.

3. The combination of claim 1, and an o-ring mounted in said pin member, whereby said pin member remains positioned at any predetermined position in its boss portion.

4. The combination of claim 1, said one boss portion being formed with a through stepped opening, said pin comprising a larger diameter body portion and a stepped down stud portion, said stud portion passing through said stepped down portion of said through opening in said boss, an operating knob mounted on the free end of said stepped down portion, said one boss portion being formed with a stepped through opening to receive said pin portions respectively, whereby said pin member is trapped in said one boss portion in the assembled condition of said boss portions with the inside end of said pin larger diameter body portion in said arcuate slot.

5. The combination of claim 1, each of said boss portions comprising an inner cylindrical portion extending towards each other, said spring means comprising a torsion spring positioned around said inner cylindrical portions, and the ends of said torsion spring being anchored in said mating boss portions respectively.

6. In a power miter saw of the type comprising a bridge-like base and saw means mounted on a swinging lever pivotally mounted below the base for motion about a vertical axis, the improvement comprising one hand operated detent and locking means at the front end of said swinging lever and cooperable with said base, said detent and locking means comprising a manually operable trigger member mounted on said lever front end and having a finger operated portion and a detent lug portion cooperable with detent recesses formed in said base, said detent and locking means further comprising threaded stud means having a nose portion adapted to bear against a cooperating portion of said base, said stud means and said trigger member being mounted on said front end of said lever in such closely spaced relation to each other that an operator can operate said trigger member and turn said stud means with one hand to thereby simultaneously release the detent lug and turn the threaded stud means to thereby release said lever and saw means with respect to said base for motion thereof about said vertical axis.

7. The combination of claim 6, said base member cooperating portion comprising a forwardly extending arcuate flange portion, said detent recesses being positioned at the underside thereof and at predetermined angular locations around said arcuate flange, a handle member carrying said threaded stud means and fitted in a threaded opening in said swinging lever front end, said stud nose end being cooperable with the outer edge of said arcuate flange portion, and spring means normally biasing said trigger to urge said detent lug towards said detent recesses.

8. The combination of claim 7, and a bearing member positioned between said nose end of said handle and the cooperating edge of said arcuate flange.

9. The combination of claim 7, said swinging lever front end comprising a stepped down portion positioned below said arcuate flange and an upwardly extending finger terminating below the top surface of said arcuate flange, said upstanding finger being formed with a through opening and comprising means for pivotally mounting said trigger member in said opening, said spring means comprising a compression spring held between the portion of said trigger carrying said lug portion and a recess in said stepped down portion of said swinging lever, and said stud means being carried by said finger closely adjacent and above said trigger member.

10. The combination of claim 9, wherein said closely spaced relation of said trigger member and said handle member is such that an operator can depress said trigger member to move said lug out of a detent recess against the force of said spring while at the same time turning said handle member to position said nose end away from said arcuate flange.

11. The combination of claim 7, and arcuate indicator means on the upper surface of said arcuate flange portion, and cooperating indicator means on the front end of said swinging lever.

12. A power miter saw having a generally bridge-like base and comprising a pair of leg portions and a top portion extending thereacross, a swinging lever pivotally mounted underneath said base top portion, one hand operated detenting and locking means at the front end of said lever and cooperable with a portion of said base top portion, saw means, means to mount said saw means at the rear end of said swinging lever, said mounting means including means to lock said saw means in a down position and means to define the upper and lower limits of motion of said saw means with respect to said rear end of said lever, and spring means normally biasing said saw means upwardly on said lever with respect to said base.

13. A power miter saw having a generally bridge-like base and comprising a pair of leg portions and a top portion extending thereacross, a swinging lever pivotally mounted underneath said base top portion, one hand operated detenting and locking means at the front end of said lever and cooperable with a portion of said base top portion, saw means, means to mount said saw means at the rear end of said swinging lever, said mounting means including means to lock said saw means in a down position and means to define the upper and lower limits of motion of said saw means with respect to said rear end of said lever, and spring means normally biasing said saw means upwardly on said lever with respect to said base said mounting means comprising a saw arm carrying said saw means on the forward end thereof, said mounting means comprising a pair of boss portions formed one on said saw arm and the other on the rear end of said swinging lever, a pin member carried by one of said boss portions, an arcuate slot and a hole deeper than the depth of said arcuate slot formed in the other of said boss portions, said pin member being so configured with respect to said one of said boss portions that the free end of said pin is positioned in said arcuate slot formed in said one of said boss portions in the assembled together condition of said boss portions, and said hole being so located with respect to the location of said pin member that said saw means is locked to a down position in closely spaced relation to said base top portion when said pin member is in said hole.

14. The combination of claim 13, wherein said saw arm boss portion is formed with said arcuate slot, and said swinging lever boss portion carries said pin member.

15. The combination of claim 13, and an o-ring mounted on said pin member, whereby said pin member tends to remain at any predetermined position at which it is located.

16. The combination of claim 13, said one boss portion being formed with a through stepped opening, said pin comprising a larger diameter body portion and a stepped down stud portion, said stud portion passing through said stepped down portion of said through opening in said boss, an operating knob mounted on the free end of said stepped down portion, said one boss portion being formed with a stepped through opening to receive said pin portions respectively, whereby said pin member is trapped in said one boss portion in the assembled condition of said boss portions with the inside end of said pin larger diameter body portion in said arcuate slot.

17. The combination of claim 13, each of said boss portions comprising an inner cylindrical portion extending towards each other, said spring means comprising a torsion spring positioned about said inner cylindrical portions, and the ends of said torsion spring being anchored in said mating boss portions respectively.

18. A power miter saw having a generally bridge-like base and comprising a pair of leg portions and a top portion extending thereacross, a swinging lever pivotally mounted underneath said base top portion, one hand operated detenting and locking means at the front end of said lever and cooperable with a portion of said base top portion, saw means, means to mount said saw means at the rear end of said swinging lever, said mounting means including means to lock said saw means in a down position and means to define the upper and lower limits of motion of said saw means with respect to said rear end of said lever, and spring means normally biasing said saw means upwardly on said lever with respect to said base, said one hand operated locking and detenting means comprising a detent trigger mounted on said front end of said swinging lever, said base member top portion having a forwardly extending arcuate flange portion formed with a plurality of detent recesses positioned at the underside thereof and at predetermined angular locations around said arcuate flange, a handle member having a threaded stud portion fitted in a threaded opening in said swinging lever front end, said stud portion having a nose end cooperable with the edge of said arcuate flange of said base member top portion, said trigger having a detent lug adapted to fit within a selected one of said detent recesses, and spring means normally biasing said trigger to urge said detent lug thereof towards said detent recesses.

19. The combination of claim 18, and a bearing member on said front end of said swinging lever positioned between said nose end of said handle stud and the cooperating edge of said base member top portion arcuate flange.

20. The combination of claim 18, said swinging lever front end comprising a stepped down portion positioned below said arcuate flange and an upwardly extending finger terminating below the top surface of said arcuate flange, said upstanding finger being formed with a through opening and comprising means for pivotally mounting said trigger member in said opening, said spring means comprising a compression spring held between the portion of said trigger carrying said lug and a recess in said stepped down portion of said swinging lever, and said stud portion of said handle member being carried by said finger closely adjacent and above said trigger member.

21. The combination of claim 20, wherein said closely spaced relation of said trigger member and said handle member is such that an operator can depress said trigger member to move said lug out of a detent recess against the force of said spring while at the same time turning said handle member to position said nose portion of said stud portion away from said outer edge of said arcuate flange.

22. The combination of claim 18, and arcuate indicator means on the upper surface of said arcuate flange portion, and cooperating indicator means on the front end of said swinging lever.

23. A power miter saw comprising:
a base;
a swinging lever pivotally mounted on said base for motion about a vertical axis;
saw means for performing miter cuts on a workpiece;
mounting means for pivotally mounting said saw means at the rear end of said swinging lever; and,
one-hand operated pivotable detentind and rotatable locking means coactable with said base for manually angularly locating said swinging lever with respect to said base and for locking said swinging lever with respect to said base.

24. The power miter saw of claim 23, said one-hand operated pivotable detenting and rotatable locking means including:
a handle defining a longitudinal axis and mounted on said swinging lever so as to extend in the longitudinal direction of said lever, said handle being mounted on said lever to be rotatable about said longitudinal axis in such a manner so as to rotatably advance and move therealong for engaging said base;
a plurality of detent recesses formed in said base; and,
a detent lever pivotally mounted on said swinging lever so as to be pivotable about an axis transverse to said longitudinal axis, said detent lever being mounted beneath said handle and adapted to engage said detent recesses for angularly locating said swinging lever with respect to said base when the same is moved by the operator.

* * * * *